United States Patent [19]

Suzuki et al.

[11] Patent Number: 5,238,757
[45] Date of Patent: Aug. 24, 1993

[54] ALKALINE STORAGE BATTERY HAVING AN IMPROVED CURRENT COLLECTOR TAB

[75] Inventors: Norio Suzuki; Hiromi Maruyama; Kaichi Okami, all of Chigasaki, Japan

[73] Assignee: Mstsushita Electric Industrial Co., Ltd., Osaka, Japan

[21] Appl. No.: 799,652

[22] Filed: Nov. 29, 1991

[30] Foreign Application Priority Data

Jan. 8, 1991 [JP] Japan .................. 3-000506

[51] Int. Cl.$^5$ .............................................. H01M 2/22
[52] U.S. Cl. ..................... 429/94; 429/122; 429/161; 429/199; 429/206
[58] Field of Search ............. 429/122, 161, 206, 199, 429/94

[56] References Cited

U.S. PATENT DOCUMENTS

| | | | |
|---|---|---|---|
| 4,332,867 | 6/1982 | Tsuda et al. ................. | 429/94 |
| 4,529,675 | 7/1985 | Sugalski ...................... | 429/94 |
| 4,554,227 | 11/1985 | Takagaki et al. ............ | 429/178 |
| 5,043,235 | 8/1991 | Seefeldt et al. ............. | 429/94 |

Primary Examiner—Olik Chaudhuri
Assistant Examiner—M. Nuzzolillo
Attorney, Agent, or Firm—Lowe, Price, LeBlanc & Becker

[57] ABSTRACT

An alkaline storage battery such as a sealed nickel-cadmium storage battery has an improved upper current collector tab welded to the terminal edge of a spirally wound electrode of a spirally coiled electrode assembly. The current collector tab comprises a current collecting tab and a lead tab. The current collecting tab is higher in electric resistance than the lead tab, so that the current collecting tab can easily be welded to the terminal edge of the electrode of the electrode assembly. The lead tab provides a low internal resistance to allow charging and discharging electric currents to flow easily for improved high-rate discharge performance of the battery.

6 Claims, 2 Drawing Sheets

ALKALINE STORAGE BATTERY HAVING AN IMPROVED CURRENT COLLECTOR TAB

BACKGROUND OF THE INVENTION

1. Field of the Invention

The present invention relates to an alkaline storage battery such as a sealed nickel-cadmium storage battery or the like, and more particularly to an alkaline storage battery having an improved current collector tab structure for increased high-rate discharge performance.

2. Prior Art

One conventional alkaline storage battery is shown in FIGS. 4 and 5 of the accompanying drawings. The known alkaline storage battery has an electrode assembly 24 comprising a strip-shaped positive electrode 22 and a strip-shaped negative electrode 33 which are wound as spiral coils with a separator 21 interposed therebetween. The electrode assembly 24 is housed in a nickel-plated steel case 25 which doubles as the negative terminal of the storage battery. The positive electrode 22 has a terminal edge 26 projecting from one end of the electrode assembly 24, whereas the negative electrode 23 has a terminal edge 27 projecting from the other end of the electrode assembly 24. The terminal edge 26 is connected to an upper current collector tab 28 which comprises a circular collecting tab 29 welded to the terminal edge 26 and a rectangular lead tab 30 extending from the circular collecting tab 29, the rectangular lead tab 30 having a width smaller than the diameter of the circular collecting tab 29. The lead tab 30 is spot-welded to a sealing cover 31 of the case 25, the sealing cover 31 serving as the positive terminal of the storage battery. The terminal edge 27 is connected to a lower current collector tab 32 which comprises a circular collecting tab 33 welded to the terminal edge 27 and a tongue-shaped lead tab 34 attached to the center of the circular collecting tab 33. The lead tab 34 is spot-welded to the inner surface of the bottom of the case 25 at the center of the circular collecting tab 33.

It is known that the high-rate discharge performance of the alkaline storage battery of such a construction greatly varies depending on the internal resistance of the storage battery.

The current collector tabs 28, 32 are spot-welded to the terminal edges 26, 27, respectively, of the electrode assembly 24. To spot-weld such a current collector tab to a terminal edge of an electrode assembly, one surface of the current collector tab is held against the terminal edge of the electrode assembly, and a pair of spot-welding electrodes is disposed on the other opposite surface of the current collector tab. During a spot-welding process, the welding current which is supplied between the spot-welding electrodes flows from the terminal edge of the electrode assembly to the electrode assembly itself through the current collector tab. In the case where the current collecting tab and lead tab of the current collector tab have the same thickness and are made of materials having the same resistivity, the overall thickness of the current collector tab may be increased or the current collector tab may have a plurality of current collecting tabs and lead tabs with a view to reducing the electric resistance of the entire current collector tab, as is well known in the art.

If the overall thickness of the current collector tab is increased in order to reduce the electric resistance thereof, then when the current collector tab is welded to the terminal edge of the electrode assembly, the loss current flowing through the current collector tab is increased, thereby reducing the welding current flowing through the joint between the terminal edge of the electrode assembly and the current collector tab. As a result, the joint cannot be welded effectively. It is therefore preferable to reduce the thickness of the current collector tab in order to minimize the loss current which flows during the welding process. If the current collector tab is thinned, however, the electric resistance of the lead tab on which the current is concentrated is increased.

If the current collector tab has a plurality of current collecting tabs and lead tabs are employed, then since they are successively spot-welded, the terminal edge of the electrode assembly tends to become brittle and the separator is liable to be damaged due to the heat applied in the welding process. Because of an increased number of welding steps required, the welding process is time-consuming and complex, resulting in a reduction in the rate of production. Consequently, it is impossible to reduce the electric resistance of the lead tab and hence the entire current collector tab.

SUMMARY OF THE INVENTION

It is an object of the present invention to provide an alkaline storage battery which includes a current collector tab having a reduced electric resistance and exhibits increased high-rate discharge performance due to a low internal resistance, while allowing current collector tabs to be welded effectively to an electrode assembly without thermal damage to the electrode assembly.

According to the present invention, there is provided an alkaline storage battery comprising a case serving as one of positive and negative terminals, the case having an opening, an electrode assembly housed in the case, the electrode assembly comprising a positive electrode and a negative electrode which are wound as spiral coils with a separator interposed therebetween, the positive and negative electrodes having opposite terminal edges, a sealing cover mounted in the opening with an insulating seal ring therebetween, the sealing cover serving as the other terminal, and a pair of current collector tab means for collecting an electric current, one of the current collector tab means electrically connecting the terminal edge of one of the positive and negative electrodes to the case, the other current collector tab means electrically connecting the terminal edge of the other of the positive and negative electrodes to the sealing cover. The other current collector tab means comprises a current collecting tab welded to the terminal edge of the other of the positive and negative electrodes and a lead tab welded to the sealing cover. The current collecting tab and the lead tab are made of materials having different resistivities, the resistivity of the material of the lead tab being smaller than the resistivity of the material of the current collecting tab.

The current collecting tab and the lead tab are mechanically and electrically connected to each other by welding, brazing, staking, or electrically conductive adhesive.

The current collecting tab comprises a steel plate which is plated with a nickel, and the lead tab comprises a nickel plate.

With the above arrangement, the current collecting tab and the lead tab can easily be welded to the terminal edge of the other electrode and the sealing cover, respectively, without thermal damage to the electrode assembly. The resistance of the current collector tab is reduced for improved high-rate discharge performance of the battery.

More specifically, since the materials of the current collecting tab and the lead tab have different resistivities, and the resistivity of the lead tab is smaller than the resistivity of the current collecting tab, the resistance of the lead tab on which the charging and discharging electric currents are concentrated is reduced, resulting in a reduction in the overall resistance of the current collector tab. Accordingly, the alkaline storage battery has a low internal resistance for higher high-rate discharge performance.

The above and other objects, features and advantages of the present invention will become more apparent from the following description when taken in conjunction with the accompanying drawings in which a preferred embodiments of the present invention is shown by way of illustrative example.

DETAILED DESCRIPTION

Figure 1:
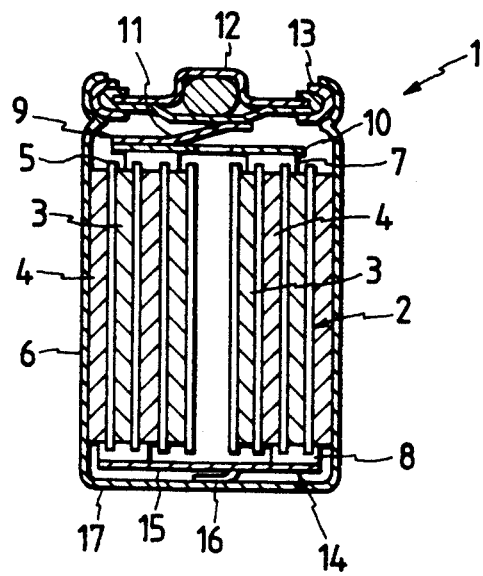
FIG. 1 is a longitudinal cross-sectional view of an alkaline storage battery according to an embodiment of the present invention.
Figure 2:
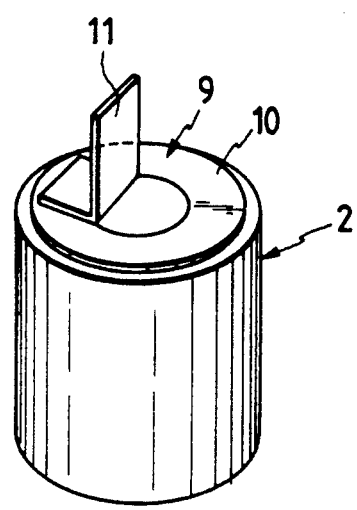
FIG. 2 is a perspective view of an internal structure of the alkaline storage battery shown in FIG. 1, showing an upper current collector tab and an electrode assembly that are joined to each other.

FIGS. 1 and 2 show an alkaline storage battery according to an embodiment of the present invention. As shown in FIGS. 1 and 2, the alkaline storage battery is in the form a nickel-cadmium storage battery having the nominal capacity of 1.2 Ah. According to the present invention, the alkaline storage battery has a current collector tab composed of a current collecting tab and a lead tab, the lead tab being made of a material whose resistivity is smaller than that of the material of the current collecting tab.

The alkaline storage battery, generally designated by the reference numeral 1 in FIGS. 1 and 2, includes an electrode assembly 2 comprising a strip-shaped positive electrode 3 and a strip-shaped negative electrode 4 which are wound as spiral coils with a separator 5 interposed therebetween. The electrode assembly 2 is housed in a cylindrical nickel-plated steel case 6 which doubles as the negative terminal of the storage battery. The positive electrode 3 has a terminal edge 7 projecting from one end of the electrode assembly 2, whereas the negative electrode 4 has a terminal edge 8 projecting from the other end of the electrode assembly 2.

The alkaline storage battery has an upper current collector tab 9 connected to the terminal edge 7 of the positive electrode 3. The upper current collector tab 9 comprises a circular current collecting tab 10 resistance-welded to the terminal edge 7 of the positive electrode 3, and a rectangular lead tab 11 mechanically and electrically connected to the current collecting tab 10 by spot welding, brazing, staking, or electrically conductive adhesive. The upper current collector tab 9 is in the form of a steel plate that is plated with nickel and has a thickness of 0.2 mm. The lead tab 11 is in the form of a nickel plate. Therefore, the resistivity of the lead tab 11 is smaller than the resistivity of the current collecting tab 10.

FIG. 2 shows the electrode assembly 2 and the upper current collector tab 9 before they are placed in the case 6. With the electrode assembly 2 and the upper current collector tab 9 being positioned in the case 6, the distal end of the lead tab 11 is deformed and spot-welded to a sealing cover 12 of the case 6, see FIG. 1, the sealing cover 12 doubling as the positive terminal of the storage battery 1. The sealing cover 12 is mounted in an end opening of the case 6 with an insulating seal ring 13 therebetween.

The terminal edge 8 is connected to a lower current collector tab 14 which comprises a circular collecting tab 15 spot-welded to the terminal edge 8 and a tongue-shaped lead tab 16 attached to the center of the circular collecting tab 15. The lead tab 16 is spot-welded to the inner surface of the bottom 17 of the case 6 at the center of the circular collecting tab 15.

The storage battery thus constructed will be to as a storage battery A. An electric current supplied from the current collecting tab 10 of the current collector tab 9 flows to the sealing cover 12 through the lead tab 11 joined to the current collecting tab 10. According to the storage battery A, the density of the current flowing through the nickel lead tab 11 is reduced to half the density of the current flowing through a conventional nickel-plated steel lead tab, and the electric resistance of the current collector tab 9 is substantially reduced. The internal resistance of the storage battery A is about 30% lower than the internal resistance of a conventional nickel-cadmium storage battery.

Figure 3:
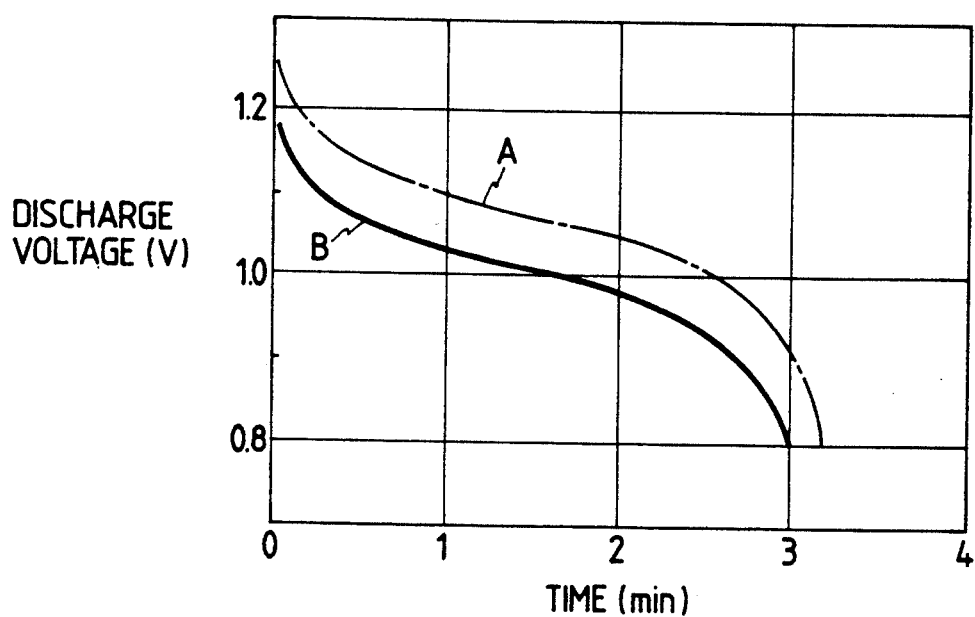
FIG. 3 is a graph showing discharge performances of the alkaline storage battery of the present invention and a conventional alkaline storage battery.
Figure 4:
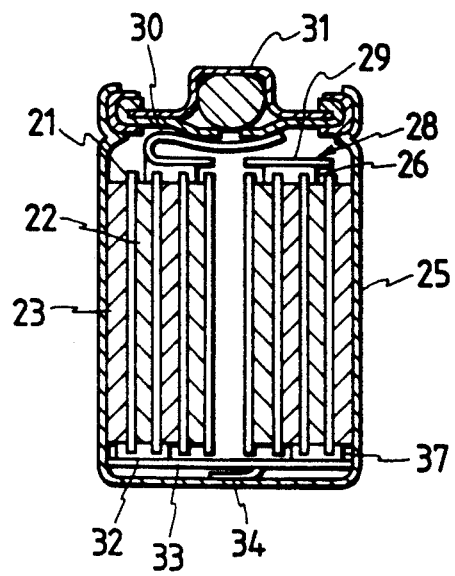
FIG. 4 is a longitudinal cross-sectional view of a conventional alkaline storage battery.
Figure 5:
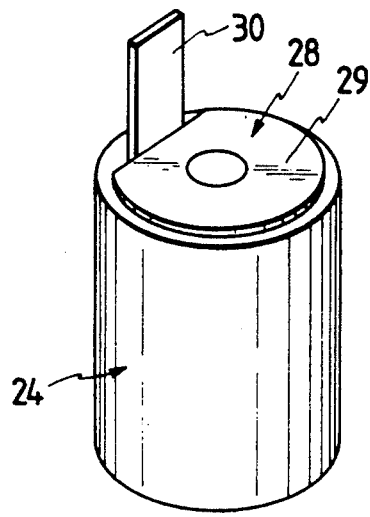
FIG. 5 is a perspective view of an internal structure of the conventional alkaline storage battery.

FIG. 3 shows the discharge voltages of the storage battery A according to the present invention and a conventional storage battery B, the discharge voltages being plotted against time after the storage batteries have fully been charged and then discharged with an electric current of 20 A flowing from the storage batteries. It can be seen from FIG. 3 that the storage battery A with the reduced internal resistance exhibits higher high-rate discharge performance and a higher discharge voltage than the conventional storage battery B.

With the present invention, as described above, since the electric resistance of the current collector tab is reduced, the alkaline storage battery has higher high-rate discharge performance, i.e., can keep a higher discharge voltage upon a high-rate discharge.

Although a certain preferred embodiment has been shown and described, it should be understood that many changes and modifications may be made therein without departing from the scope of the appended claims.

What is claimed is:

1. An alkaline storage battery comprising:
   a case serving as one of positive and negative terminals, said case having an opening;
   an electrode assembly housed in said case, said electrode assembly comprising a positive electrode and a negative electrode which are wound as spiral coils with a separator interposed therebetween, said positive and negative electrodes having opposite terminal edges;
   a sealing cover mounted in said opening with an insulating seal ring therebetween, said sealing cover serving as the other terminal;

a pair of current collector tab means for collecting an electric current, one of said current collector tab means electrically connecting the terminal edge of one of said positive and negative electrodes to said case, the other current collector tab means electrically connecting the terminal edge of the other of said positive and negative electrodes to said sealing cover;

said other current collector tab means comprising a current collecting tab welded to the terminal edge of the other of said positive and negative electrodes and a lead tab welded to said sealing cover; and said current collecting tab and said lead tab being made of materials having different resistivities, the resistivity of the material of said lead tab being smaller than the resistivity of the material of said current collecting tab.

2. An alkaline storage battery according to claim 1, wherein said current collecting tab and said lead tab are mechanically and electrically connected to each other by welding.

3. An alkaline storage battery according to claim 1, wherein said current collecting tab and said lead tab are mechanically and electrically connected to each other by brazing.

4. An alkaline storage battery according to claim 1, wherein said current collecting tab and said lead tab are mechanically and electrically connected to each other by staking.

5. An alkaline storage battery according to claim 1, wherein said current collecting tab and said lead tab are mechanically and electrically connected to each other by electrically conductive adhesive.

6. An alkaline storage battery according to claim 1, wherein said current collecting tab comprises a steel plate which is plated with a nickel, and said lead tab comprises a nickel plate.

* * * * *

UNITED STATES PATENT AND TRADEMARK OFFICE
CERTIFICATE OF CORRECTION

PATENT NO. : 5,238,757
DATED : August 24, 1993
INVENTOR(S) : Suzuki et al

It is certified that error appears in the above-indentified patent and that said Letters Patent is hereby corrected as shown below:

On the title page, please correct the Assignee's name to read as follows:

"Matsushita Electric Industrial Co., Ltd., Osaka, Japan"

Signed and Sealed this

Twenty-sixth Day of April, 1994

Attest:

BRUCE LEHMAN

Attesting Officer    Commissioner of Patents and Trademarks